US007472844B2

(12) United States Patent
Manubolu et al.

(10) Patent No.: US 7,472,844 B2
(45) Date of Patent: Jan. 6, 2009

(54) FUEL INJECTOR NOZZLE WITH TIP ALIGNMENT APPARATUS

(75) Inventors: Avinash R. Manubolu, Peoria, IL (US); Avtar S. Sandhu, Bloomington, IL (US); Christopher A. Greer, Peoria, IL (US); Venu G. Garimidi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 389 days.

(21) Appl. No.: 11/313,415

(22) Filed: Dec. 21, 2005

(65) Prior Publication Data

US 2007/0145163 A1 Jun. 28, 2007

(51) Int. Cl.

*F02M 59/00* (2006.01)
*F02M 61/00* (2006.01)
*F02M 63/00* (2006.01)
*F02M 47/02* (2006.01)
*F02M 61/10* (2006.01)
*B05B 1/14* (2006.01)
*B05B 1/00* (2006.01)
*F23D 14/68* (2006.01)
*F16L 17/00* (2006.01)
*F16L 19/00* (2006.01)
*F16L 33/18* (2006.01)
*F16L 21/02* (2006.01)
*F16L 23/00* (2006.01)

(52) U.S. Cl. ................. 239/533.2; 239/88; 239/533.11; 239/590; 239/600; 285/360; 285/361; 285/363

(58) Field of Classification Search ................. 137/530, 137/542; 239/88, 533.2, 53.3, 533.11, 533.12, 239/584, 585.1, 585.4, 585.5, 590, 900, 600; 251/129.21, 254, 255, 256; 285/360, 361, 285/362, 363

See application file for complete search history.

(56) References Cited

U.S. PATENT DOCUMENTS 1,134,179 A * 4/1915 Boyd ......................... 285/362

(Continued)

FOREIGN PATENT DOCUMENTS

DE 103 33 786 A1 2/2005

(Continued)

OTHER PUBLICATIONS

PCT International Search Report; PCT/US2006/044294; International Filing Date: Nov. 15, 2006; Applicant: Caterpillar Inc.

*Primary Examiner*—Len Tran
*Assistant Examiner*—Ryan Reis
(74) *Attorney, Agent, or Firm*—Liell & McNeil

(57) ABSTRACT

A fuel injector nozzle assembly is disclosed. The assembly may include a nozzle casing, a first tip member, and a second tip member. The first tip member may extend longitudinally within the nozzle casing and may define first and second shoulders on the first tip member. The second tip member may extend longitudinally within the nozzle casing and may be arranged in predetermined rotational alignment with the first tip member. The second tip member may define a third shoulder on the second tip member configured to interact with the first shoulder to oppose rotation of the first tip member relative the second tip member in a first direction about a longitudinal axis of the first tip member. The second tip member may further define a fourth shoulder on the second tip member configured to interact with the second shoulder to oppose rotation of the first tip member relative the second tip member in a second direction about a longitudinal axis of the first tip member.

26 Claims, 4 Drawing Sheets

U.S. PATENT DOCUMENTS

| | | | | | |
|---|---|---|---|---|---|
| 2,111,859 | A * | 3/1938 | Kennedy | ...................... | 285/85 |
| 2,582,539 | A | 1/1952 | Grimod | | |
| 4,714,066 | A | 12/1987 | Jordan | | |
| 5,108,037 | A | 4/1992 | Okamoto et al. | | |
| 5,141,024 | A | 8/1992 | Hicks | | |
| 5,467,924 | A | 11/1995 | Buescher et al. | | |
| 5,615,860 | A | 4/1997 | Brehm et al. | | |
| 5,755,386 | A | 5/1998 | Lavan et al. | | |
| 6,042,028 | A | 3/2000 | Xu | | |
| 6,105,884 | A | 8/2000 | Molnar et al. | | |
| 6,230,983 | B1 | 5/2001 | Kasen | | |
| 6,318,643 | B1 | 11/2001 | Cooke | | |
| 6,481,646 | B1 | 11/2002 | Hornby | | |
| 6,520,421 | B2 | 2/2003 | Dallmeyer et al. | | |
| 6,655,612 | B2 * | 12/2003 | Oliver | ...................... | 239/585.4 |
| 6,666,387 | B2 | 12/2003 | Kubo | | |
| 6,732,949 | B1 | 5/2004 | Harn Dorf | | |
| 6,824,084 | B2 | 11/2004 | Maier et al. | | |
| 6,840,467 | B2 | 1/2005 | Dantes et al. | | |
| 6,886,760 | B2 | 5/2005 | Potz et al. | | |
| 6,899,291 | B2 | 5/2005 | Liskow | | |
| 6,913,210 | B2 | 7/2005 | Baasch et al. | | |
| 6,932,283 | B2 | 8/2005 | Stier | | |
| 6,935,582 | B2 | 8/2005 | Ruehle et al. | | |
| 6,938,839 | B2 | 9/2005 | Xu et al. | | |
| 6,945,478 | B2 | 9/2005 | Spencer | | |
| 6,948,665 | B2 | 9/2005 | Joseph | | |
| 6,948,667 | B2 | 9/2005 | Eichendorf | | |
| 6,953,162 | B2 | 10/2005 | Hans | | |
| 6,959,695 | B2 | 11/2005 | Warner et al. | | |
| 6,962,141 | B2 | 11/2005 | Kern | | |
| 6,962,144 | B2 | 11/2005 | Chretien et al. | | |
| 2001/0017324 | A1 | 8/2001 | Coldren et al. | | |
| 2002/0100822 | A1 | 8/2002 | Oliver | | |
| 2002/0109021 | A1 | 8/2002 | Kiriki et al. | | |
| 2003/0085305 | A1 | 5/2003 | Clarke et al. | | |
| 2004/0041038 | A1 | 3/2004 | Delaney et al. | | |

FOREIGN PATENT DOCUMENTS

| | | |
|---|---|---|
| GB | 525630 | 9/1940 |

* cited by examiner

FUEL INJECTOR NOZZLE WITH TIP ALIGNMENT APPARATUS

TECHNICAL FIELD

This disclosure relates generally to an alignment apparatus and, more particularly, to a fuel injector nozzle with a tip alignment apparatus.

BACKGROUND

During assembly of a fuel injector nozzle, certain components must be properly aligned. For example, it may be desirable for injection holes within a nozzle tip to be arranged in a desired orientation relative a nozzle casing. Thus, when the nozzle casing is assembled to an engine in a predetermined orientation, the injection holes will be arranged in a desired manner relative the engine, for example toward a particular portion of a combustion chamber of the engine.

In one known apparatus, a fuel injector nozzle includes a two-piece tip assembly. A first generally cylindrical tip member includes first and second ends. The first end has fuel injection holes therein and extends outward from a nozzle casing. The second end is held within the nozzle casing and engages a generally cylindrical second tip member, which is completely arranged within the nozzle casing. The second tip member is held in a predetermined rotational configuration relative the nozzle casing, for example via a pin-and-slot arrangement. The first and second tip members are also held in rotational alignment with respect to each other via a pin-and-slot arrangement. For example, the first and second tip members each have a slot formed therein for receipt of a pin. During assembly, the first tip member is rotated relative the second tip member until their respective slots are aligned. Then a pin is inserted into the slots to secure the tip members in rotational alignment with respect to each other.

While the fuel injector arrangement described above may be effective for achieving rotational alignment of a fuel injector tip relative a nozzle casing, certain improvements may be desired. For example, it may be desirable to reduce the overall size or weight of a fuel injector nozzle. Thus, injector walls may be thinned, and injector components shrunken. As injector walls are made thinner and injector parts are made smaller, certain pin-and-slot arrangements, or other similar arrangements, may become less desirable. Moreover, it may be desirable to provide a robust tip alignment mechanism suitable for a simple assembly process. It may further be desirable to provide a nozzle assembly with fewer parts.

The present invention is directed to overcome or improve one or more characteristics associated with prior fuel injector nozzles.

SUMMARY OF THE INVENTION

In one aspect of the present invention, a fuel injector nozzle assembly is disclosed. The assembly may include a nozzle casing, a first tip member, and a second tip member. The first tip member may extend longitudinally within the nozzle casing and may define first and second shoulders on the first tip member. The second tip member may extend longitudinally within the nozzle casing and may be arranged in predetermined rotational alignment with the first tip member. The second tip member may define a third shoulder on the second tip member configured to interact with the first shoulder to oppose rotation of the first tip member relative the second tip member in a first direction about a longitudinal axis of the first tip member. The second tip member may further define a fourth shoulder on the second tip member configured to interact with the second shoulder to oppose rotation of the first tip member relative the second tip member in a second direction about a longitudinal axis of the first tip member.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain principles of the invention. In the drawings.

Although the drawings depict exemplary embodiments or features of the invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Generally, the same or corresponding reference numbers will be used throughout the drawings to refer to the same or corresponding parts.

Figure 1:
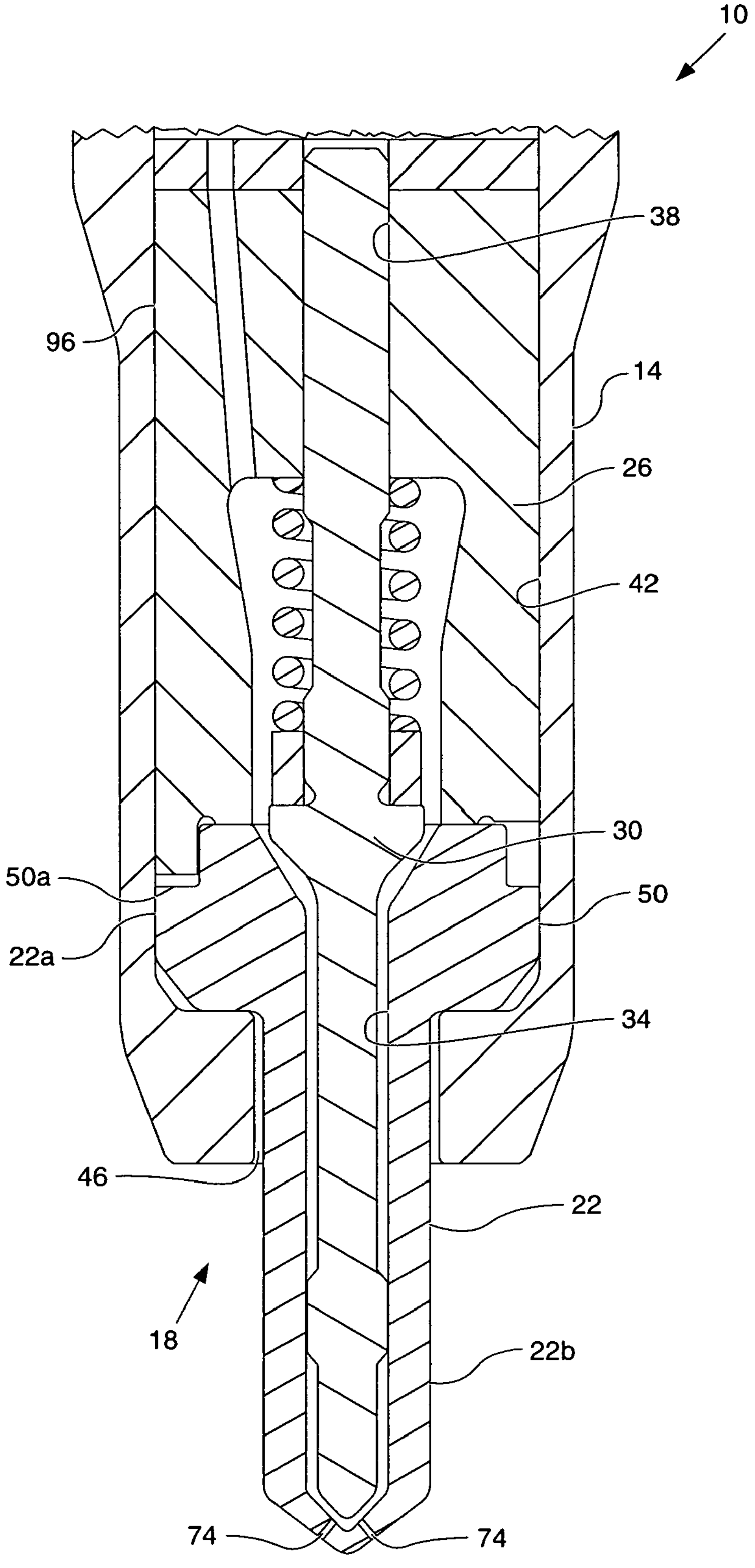
FIG. 1 is a partial diagrammatic sectioned front view of a nozzle assembly.

Referring now to FIG. 1, an embodiment of a fuel injector nozzle assembly 10 is shown. The nozzle assembly 10 may include a nozzle casing 14 for housing a tip 18 having first and second tip members 22, 26 and a valve member 30 slidably arranged within bores 34, 38 of the first and second tip members 22, 26, respectively.

An internal surface of the nozzle casing 14 may form a generally cylindrical internal wall 42 configured for interacting with the first and second tip members 22, 26 for holding the first and second tip members 22, 26 in longitudinal alignment with each other inside the nozzle casing 14. The nozzle casing 14 may have a nozzle aperture 46 therein at an end thereof, through which the first tip member 22 may extend outward of the nozzle casing 14.

Figure 2:
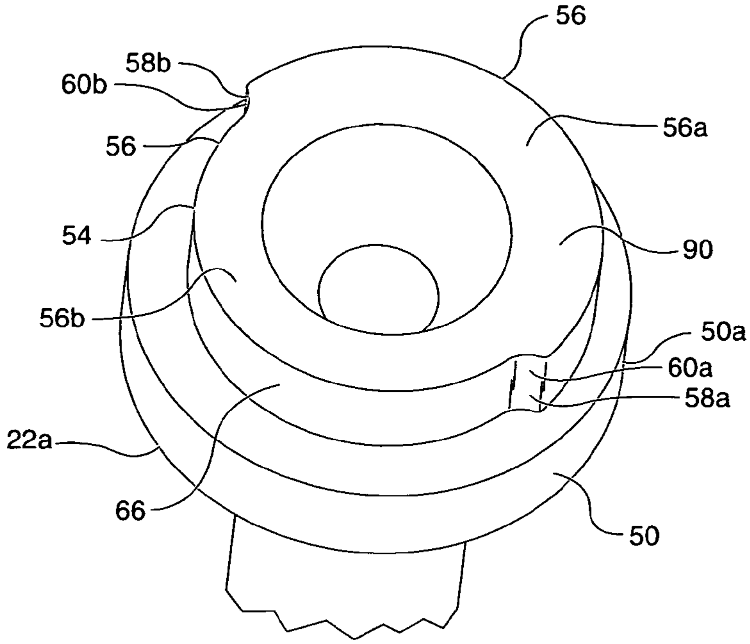
FIG. 2 is partial perspective view of a first tip member of the nozzle assembly of FIG. 1.
Figure 3:
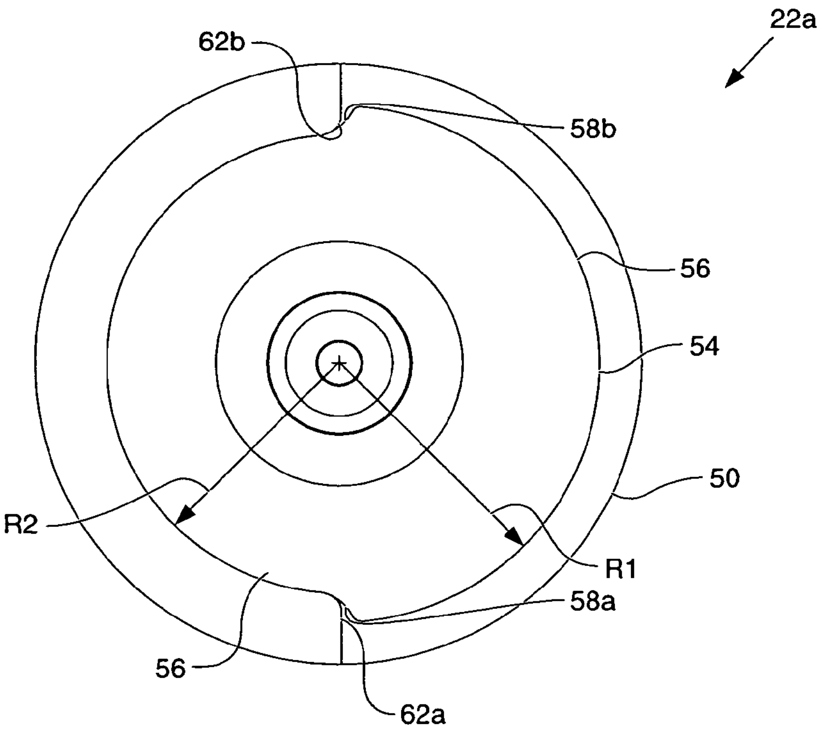
FIG. 3 is a partial sectioned top view of first and second tip members of the nozzle assembly of FIG. 1.
Figure 4:
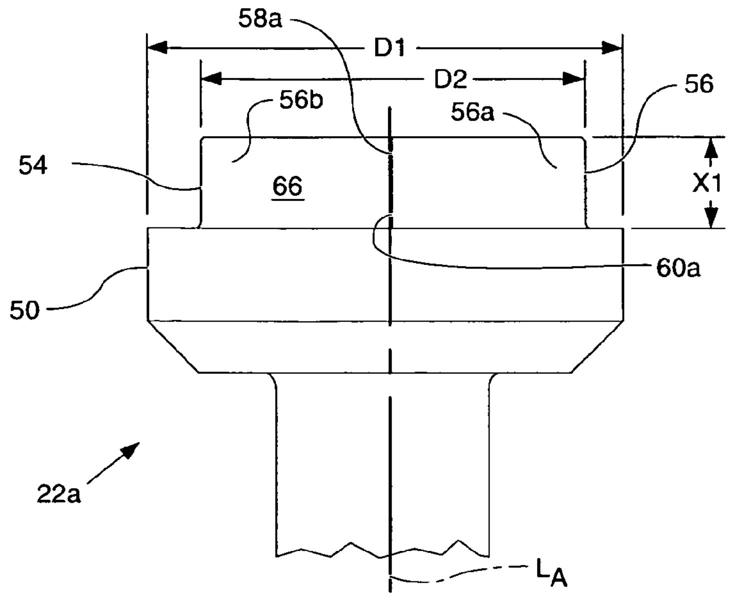
FIG. 4 is a partial front view of the first tip member of FIG. 2.

The first tip member 22 may include an internal portion 22*a* extending longitudinally within the nozzle casing 14 and an external portion 22*b* extending outward of the nozzle casing 14. With reference to FIGS. 2-4, the internal portion 22*a* of the first tip member 22 may define a first generally cylindrical portion 50 having an outer diameter D1 (FIG. 4). The internal portion 22*a* of the first tip member 22 may further define, for example at a longitudinal end of the first tip member 22, a second portion 54 defining an annular wall 56 extending longitudinally away from the first generally cylindrical portion 50 and having a reduced outer diameter D2 (FIG. 4) relative the diameter D1 of the first generally cylindrical portion 50. The annular wall 56 may fully or partially surround a longitudinal axis $L_A$ of the first tip member 22. The annular wall 56 may include a first locating surface 66 thereon for engaging a second locating surface 70 on the second tip member 26, as further described hereinbelow. The first tip member 22 may have a first bore 34 formed therein for slidably housing the valve member 30 therein.

With continued reference to FIGS. 2-4, the annular wall 56 may define first and second shoulders 58*a*, 58*b*, respectively, extending longitudinally within the nozzle casing 14 a predetermined distance X1 (FIG. 4). The predetermined distance X1 may be varied according to desired characteristics of the nozzle assembly 10 (e.g., weight, overall length, etc.), and, in a preferred embodiment, the predetermined distance X1 would be sufficiently long to allow a sufficient interactive locking arrangement with corresponding shoulders 62*a*, 62*b* (FIG. 5) formed on the second tip member 26, while being sufficiently short to control machining costs. In one particular set of embodiments, the predetermined distance X1 is in the range of from about 3 mm to about 7 mm. For example, in one embodiment, the distance X1 may be 5.3 mm.

The annular wall 56 may form a first wall portion 56*a* having a first outer radius R1 and a second wall portion 56*b* having a second outer radius R2, which is shorter than the first outer radius R1. The first and second shoulders 58*a*, 58*b* may be formed by portions 60*a*, 60*b* of the annular wall 56 formed between the first and second wall portions 56*a*, 56*b* such that the shoulders 58*a*, 58*b* may be formed on portions of the annular wall 56 having outer radii shorter than the first outer radius R1 of the first wall portion 56*a* and longer than the second outer radius R2 of the second wall portion 56*b*. Moreover, the shoulders 58*a*, 58*b* may be formed on portions 60*a*, 60*b* of the annular wall 56 having curved cross-sections.

Figure 6:
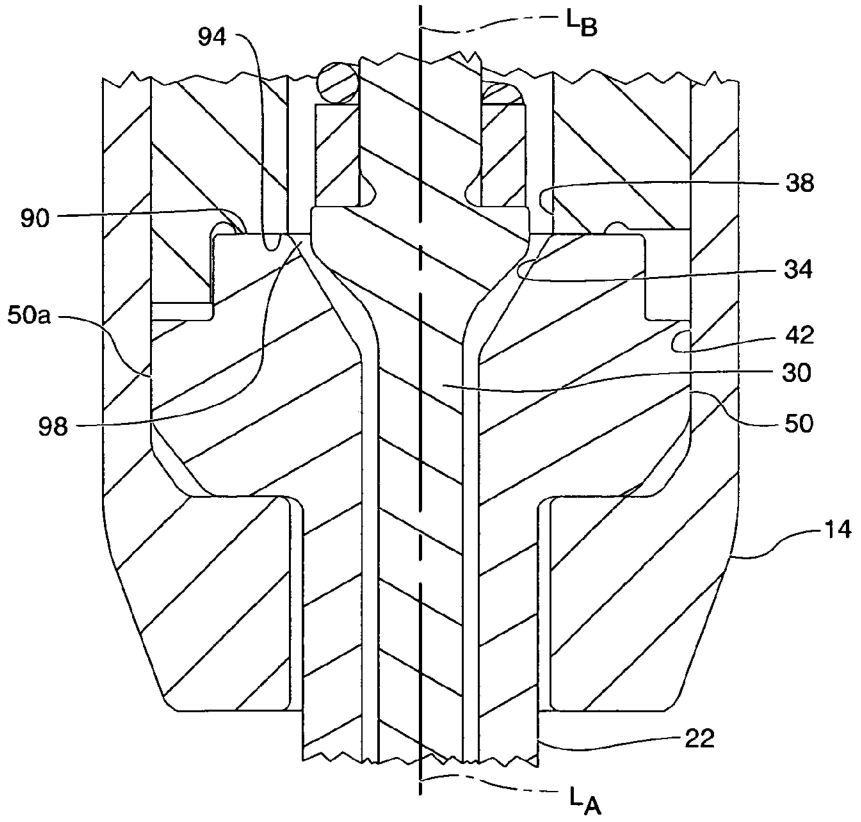
FIG. 6 is a partial sectioned front view of the nozzle assembly of FIG. 1.

With reference to FIGS. 1 and 6, the first tip member 22 may be arranged inside the nozzle casing 14 such that an outer surface 50*a* of the first generally cylindrical portion 50 of the first tip member 22 tightly engages the generally cylindrical internal wall 42 of the nozzle casing 14 to at least inhibit longitudinal disalignment of the first and second tip members 22, 26 with respect to each other.

As further illustrated in FIG. 1, the first tip member 22 may have one or more injection holes 74 formed therein at an end portion thereof. The holes 74 may be arranged on the first tip member 22 in a predetermined orientation relative the annular wall 56 and the shoulders 58*a*, 58*b* of the first tip member 22 so that when the first tip member 22 is properly assembled and aligned with the second tip member 26, which may be properly assembled and aligned with the nozzle casing 14, the holes 74 will be properly aligned in a predetermined manner with respect to the nozzle casing 14.

Figure 5:
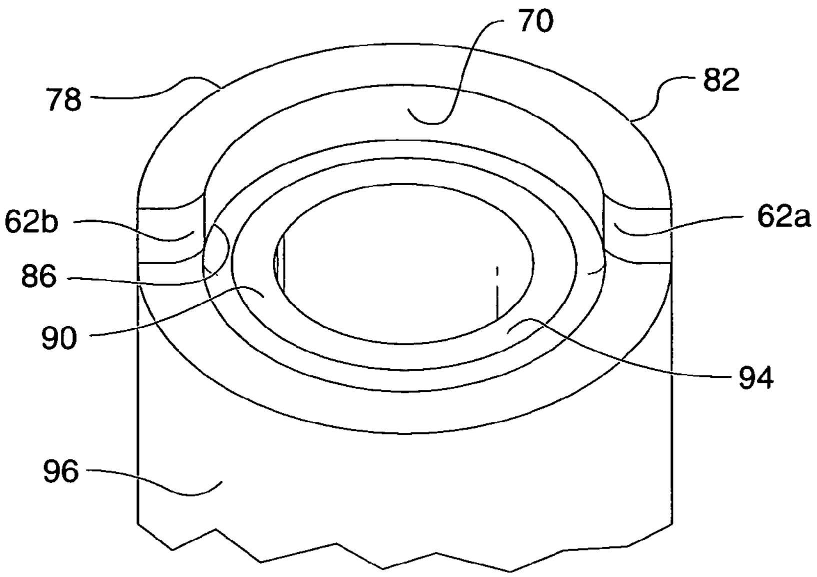
FIG. 5 is partial perspective view of the second tip member of the nozzle assembly of FIG. 1.

With reference again to FIGS. 1 and 6, the second tip member 26 extends longitudinally within the nozzle casing 14 along a longitudinal axis $L_B$ of the second tip member 26 and may engage the first tip member 22. With reference to FIG. 5, the second tip member 26 may define a first curved annular portion 78 forming an annular wall 82, which extends longitudinally within the nozzle casing 14 from a longitudinal end portion of the second tip member 26. The annular wall 82 may extend at least partially around the longitudinal axis $L_B$ of the second tip member 26.

The annular wall 82 of the second tip member 26 may define third and fourth shoulders 62*a*, 62*b* on the second tip member 26. As best demonstrated by FIG. 3, the third shoulder 62*a* may be configured to interact with the first shoulder 58*a* to oppose rotation of the first tip member 22 relative the second tip member 26 in a first direction about the longitudinal axis $L_A$ of the first tip member 22. Similarly, the fourth shoulder 62*b* may be configured to interact with the second shoulder 58*b* (FIGS. 3 and 7) to oppose rotation of the first tip member 22 relative the second tip member 26 in a second direction about the longitudinal axis $L_A$ of the first tip member 22. Moreover, the first and second shoulders 58*a*, 58*b* may have curved cross-sections, as shown in FIG. 3, and the third and fourth shoulders 62*a*, 62*b* may have curved (e.g., radiused) edges so that the shapes of the third and fourth shoulders 62*a*, 62*b* may conform at least generally to the shapes of the first and second shoulders 58*a*, 58*b*, respectively.

Figure 7:
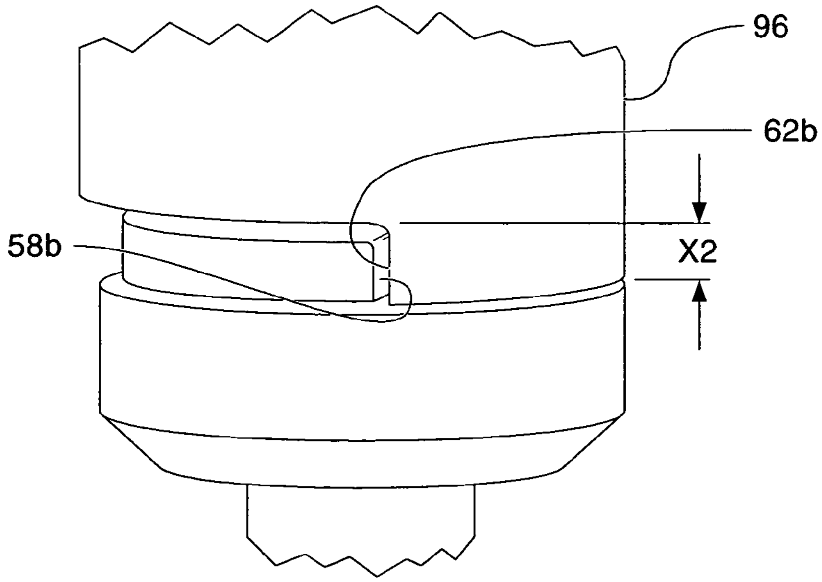
FIG. 7 is a partial front view of the nozzle assembly of FIG. 1.

With reference to FIG. 7, the third and fourth shoulders 62*a*, 62*b* may be formed to extend longitudinally within the nozzle casing 14 a predetermined distance X2. The predetermined distance X2 may be varied according to desired characteristics of the nozzle assembly (e.g., weight, overall length, etc.), and, in a preferred embodiment, the predetermined distance X2 would be sufficiently long to allow a sufficient interactive locking arrangement with corresponding shoulders 58*a*, 58*b* formed on the first tip member 22, while being sufficiently short to control machining costs. In one particular set of embodiments, the predetermined distance X2 is in the range of from about 3 mm to about 7 mm. For example, in one embodiment, the distance X2 may be 5 mm.

As shown in FIGS. 6 and 7, the first and second shoulders 58*a*, 58*b* of the first tip member 22 may overlap longitudinally with the third and fourth shoulders 62, 62*b*, respectively, for distances in the range of from about 3 mm to about 7 mm. For example, in one embodiment, the overlap distance may be 5 mm.

In the illustrated embodiment, the annular wall 82, which forms the third and fourth shoulders 62*a*, 62*b*, extends 180 degrees around the longitudinal axis $L_B$ of the second tip member. Thus, the first and second shoulders 58*a*, 58*b* are correspondingly positioned at locations 180 degrees separated on annular wall 56 of the first tip member 22. It should be appreciated that the annular wall 82 may be modified so that it extends less than 180 degrees or greater than 180 degrees around the longitudinal axis $L_B$ of the second tip member 26 and that the first and second shoulders 58*a*, 58*b* may be correspondingly designed to be positioned at locations greater than or less than 180 degrees separated, respectively, on annular wall 56 of the first tip member 22. For example, the illustrated embodiment may be reconfigured such that the annular wall 82 extends 5 degrees around the longitudinal axis $L_B$ of the second tip member 26 and such that the first and second shoulders 58*a*, 58*b* are correspondingly positioned at locations 355 degrees separated on annular wall 56 of the first tip member 22.

Referring now to FIG. 5, the annular wall 82 formed on the second tip member 26 may form at least a partial counterbore 86 geometry at a longitudinal end portion of the second tip member 26.

As referenced above, the annular wall 82 may form a second locating surface 70 thereon. The second locating surface 70 may define a surface that mates with the first locating surface 66 of the first tip member 22 for interacting with the first locating surface 66 to facilitate longitudinal alignment of the first and second tip members 22, 26. The annular wall 82 of the second tip member 26 may be configured and arranged to at least partially surround the annular wall 56 of the first tip member 22. Thus, the first locating surface 66 of the annular wall 56 may have a smooth annular shape which engages with a smooth annular shape of the second locating surface 70 of the annular wall 82 to ensure proper longitudinal alignment of the first and second tip members 22, 26 during assembly of the nozzle 10. Thus, the longitudinal axis $L_A$ of the first tip member 22 may be longitudinally aligned with the longitudinal axis $L_B$ of the second tip member 26.

The second tip member 26 may have a second bore 38 formed therein for slidably housing the valve member 30 therein. The second bore 38 may be arranged in fluid communication with the first bore 34. For example, when the first and second tip members 22, 26 are properly longitudinally and rotationally aligned, the first and second tip members 22, 26 may abut each other to provide a substantially sealed fluid path between the first and second bores 34, 38. For example as best seen in FIG. 6, at abutting end portions 90, 94 of the first and second tip members 22, 26, respectively, the bores 34, 38 may have substantially the same diameter and may be joined to form a substantially continuous channel 98 housing the valve member 30.

In one embodiment, the second tip member 26 has a generally cylindrical outer surface 96, which has an outer diameter substantially the same as the outer diameter D1 of the first tip portion 50, and which interacts with the internal wall 42 of the nozzle casing 14. For example, the outer surface 96 may be held in abutting engagement with the internal wall 42 of the nozzle casing 14. Thus, the first and second tip members 22, 26 may be held in longitudinal alignment within the nozzle casing 14 through interaction of their respective cylindrical outer surfaces 50*a*, 96 with the internal wall 42 and through interaction of the contacting surfaces 66, 70 of the first and second tip members 22, 26 with each other.

INDUSTRIAL APPLICABILITY

The present disclosure relates to an alignment apparatus and, more particularly, to a fuel injector nozzle assembly 10 with a tip alignment apparatus. Disclosed is an embodiment wherein alignment shoulders 58*a*, 58*b*, 62*a*, 62*b* formed on first and second tip members 22, 26 interact to ensure proper rotational orientation of injection holes 74 of a nozzle assembly 10. Further, contact surfaces 66, 70 formed on the first and second tip members 22, 26 may interact to facilitate longitudinal alignment of the first and second tip members 22, 26 (and the respective bores 34, 38 and longitudinal axes $L_A$, $L_B$ thereof). Moreover, interaction between outer surfaces 50*a*, 96 of the first and second tip members 22, 26 with internal portions of the nozzle casing 14 may at least inhibit longitudinal disalignment of the first and second tip members 22, 26 with respect to each other (and the respective bores 34, 38 and longitudinal axes $L_A$, $L_B$ thereof). Therefore, a valve member 30 may be slidably aligned within the bores 34, 38 of the first and second tip members 22, 26 without binding. Thus, in one aspect, the disclosure relates to a fuel injection nozzle assembly wherein first and second tip members may be properly and robustly assembled and maintained in alignment without using a pin-and-slot arrangement therebetween.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A fuel injector nozzle assembly, comprising:

a nozzle casing;

a first tip member extending longitudinally within the nozzle casing and defining first and second shoulders on the first tip member and also defining a plurality of injection holes; and a second tip member extending longitudinally within the nozzle casing and being arranged in predetermined rotational alignment with the first tip member, the second tip member defining: (i) a third shoulder on the second tip member configured to interact with the first shoulder to oppose rotation of the first tip member relative the second tip member in a first direction about a longitudinal axis of the first tip member; and (ii) a fourth shoulder on the second tip member configured to interact with the second shoulder to oppose rotation of the first tip member relative the second tip member in a second direction about a longitudinal axis of the first tip member.

2. The assembly of claim 1, wherein:

the first tip member defines an annular wall at a longitudinal end portion of the first tip member; and the first and second shoulders are defined by the wall.

3. The assembly of claim 2, wherein:

the annular wall includes a first wall portion having a first outer radius and a second wall portion having a second outer radius, at least one of the first and second shoulders being arranged at a position on the annular wall having an outer radius less than the first outer radius and greater than the second outer radius.

4. The assembly of claim 2, wherein the annular wall extends longitudinally away from a section of the first tip member having a greater outer diameter than the wall.

5. The assembly of claim 1, wherein:

the second tip member defines a curved wall at a longitudinal end portion of the second tip member; and the third and fourth shoulders are defined by the wall.

6. The assembly of claim 5, wherein the curved wall extends greater than 180 degrees around a longitudinal axis of the second tip member.

7. The assembly of claim 5, wherein the curved wall extends less than or equal to 180 degrees around a longitudinal axis of the second tip member.

8. The assembly of claim 7, wherein the curved wall extends greater than or equal to 5 degrees around a longitudinal axis of the second tip member.

9. The assembly of claim 5, wherein the curved wall forms a counterbore at the longitudinal end portion of the second tip member.

10. The assembly of claim 1, wherein:

the first tip member has a first bore therein;

the second tip member has a second bore therein; and the assembly includes a valve member slidably arranged within the first and second bores.

11. The assembly of claim 1, wherein:

the first tip member has a first bore therein;

the second tip member has a second bore therein, the second bore being arranged in fluid communication with the first bore; and the first and second tip members are disposed and arranged in abutment to provide a substantially sealed fluid path between the first and second bores.

12. The assembly of claim 11, wherein:

abutting ends of the first and second bores have substantially the same diameter and are joined to form a substantially continuous channel.

13. The assembly of claim 1, wherein:

the nozzle casing has an internal wall;

the first tip member has a first outer surface in abutting engagement with the internal wall of the nozzle casing; and the second tip member has a second outer surface in abutting engagement with the internal wall of the nozzle casing.

14. The assembly of claim 1, wherein:

the first and second tip members are arranged in longitudinal alignment within the nozzle casing; and the nozzle casing interacts with outer surfaces of the first and second tip members to at least inhibit longitudinal disalignment of the first and second tip members with respect to each other.

15. The assembly of claim 14, wherein:

the first tip member has a first generally cylindrical outer surface with a first diameter, the first generally cylindrical outer surface engaging an inner wall of the nozzle casing; and the second tip member has a second generally cylindrical outer surface with a second diameter substantially the same as the first diameter, the second generally cylindrical outer surface engaging an inner wall of the nozzle casing.

16. The assembly of claim 1, wherein:

the nozzle casing has a nozzle aperture therein; and the first tip member extends out of the nozzle casing through the nozzle aperture.

17. The assembly of claim 1, wherein:

the first and second shoulders extend longitudinally at least 3 mm.

18. The assembly of claim 17, wherein: the third and fourth shoulders extend longitudinally at least 3 mm.

19. The assembly of claim 18, wherein:

the first and second shoulders overlap longitudinally with the third and fourth shoulders, respectively, for lengths greater than or equal to 3 mm.

20. The assembly of claim 1, wherein:

the first tip member defines: (i) a first, generally cylindrical portion having an outer diameter and (ii) a second portion extending longitudinally away from the first portion and having a reduced outer diameter relative the outer diameter of the first portion; and the second tip member defines a wall extending longitudinally on the second tip member and at least partially surrounding the second portion of the first tip member; the first and second shoulders are formed on the second portion of the first tip member; and the third and fourth shoulders are formed on the wall of the second tip member.

21. The assembly of claim 1, wherein:

the first tip member includes a first annular portion with a first locating surface thereon and defining the first and second shoulders; and the second tip member includes a second annular portion with a second locating surface thereon and defining the third and fourth shoulders, the second locating surface interacting with the first locating surface to facilitate longitudinal alignment of the first and second tip members.

22. The assembly of claim 21, wherein:

the first annular portion includes an annular wall at least partially surrounding a longitudinal axis of the first tip member; and the second annular portion includes an annular wall at least partially surrounding a longitudinal axis of the second tip member.

23. A fuel injector nozzle assembly, comprising:

a nozzle casing;

a first tip member extending longitudinally within the nozzle casing and defining first and second shoulders on the first tip member; and a second tip member extending longitudinally within the nozzle casing and being arranged in predetermined rotational alignment with the first tip member, the second tip member defining: (i) a third shoulder on the second tip member configured to interact with the first shoulder to oppose rotation of the first tip member relative the second tip member in a first direction about a longitudinal axis of the first tip member; and (ii) a fourth shoulder on the second tip member configured to interact with the second shoulder to oppose rotation of the first tip member relative the second tip member in a second direction about a longitudinal axis of the first tip member;

the first tip member has one or more injection holes formed therein; and the injection holes are arranged on the first tip member in a predetermined orientation relative the first and second shoulders.

24. The assembly of claim 1, wherein at least one of the first and second shoulders has a curved cross-section.

25. A method of assembling a fuel injector nozzle assembly, including the steps of:

arranging a plurality of injections holes defined in a first tip member in a predetermined orientation relative to first and second shoulders of the first tip member;

aligning a second tip member relative to the first tip member to inhibit rotation between the first tip member and the second tip member via an interaction between the first and second shoulders of the first tip member and first and second shoulders of the second tip member.

26. The method of assembling a fuel injector nozzle assembly of claim 25, further including a step of aligning the second tip member relative to a nozzle casing such that the plurality of injection holes defined in the first tip member have a predetermined orientation relative to the nozzle casing.

* * * * *